United States Patent
Kennedy et al.

(10) Patent No.: US 6,322,616 B1
(45) Date of Patent: Nov. 27, 2001

(54) GAS SEPARATOR FOR AN OIL WELL PRODUCTION LINE

(75) Inventors: Howard L. Kennedy; Gary W. Lewis, both of Bartlesville, OK (US)

(73) Assignee: SDH, Inc., Skiatook, OK (US)

( * ) Notice: Subject to any disclaimer, the term of this patent is extended or adjusted under 35 U.S.C. 154(b) by 0 days.

(21) Appl. No.: 09/512,198

(22) Filed: Feb. 24, 2000

(51) Int. Cl.[7] .................................................. B01D 19/00
(52) U.S. Cl. ................... 96/208; 96/209; 96/211; 96/212; 96/214; 166/105.5
(58) Field of Search ......................... 210/188; 166/105.5, 166/357; 95/243, 248, 261; 96/177, 195, 208, 209, 210, 211, 212, 213, 214, 215, 216

(56) References Cited

U.S. PATENT DOCUMENTS

| | | | |
|---|---|---|---|
| 1,279,758 | * 9/1918 | Putnam | 96/214 |
| 1,554,842 | * 9/1925 | Coulter | 166/105.5 |
| 1,628,900 | * 5/1927 | Neilson | 96/214 |
| 2,718,308 | * 9/1955 | Le Bus | 96/215 |
| 2,865,470 | * 12/1958 | Sochor | 95/248 |
| 2,941,619 | * 6/1960 | Sochor | 96/208 |
| 3,624,822 | * 11/1971 | Carle et al. | 96/214 |
| 3,791,444 | * 2/1974 | Hickey | 166/105.5 |
| 4,072,481 | * 2/1978 | Laval, Jr. | 96/212 |
| 4,666,476 | * 5/1987 | Reeve et al. | 96/216 |
| 5,240,073 | * 8/1993 | Bustamante et al. | 166/105.5 |
| 5,474,601 | * 12/1995 | Choi | 96/195 |
| 5,698,014 | * 12/1997 | Cadle et al. | 96/216 |
| 5,902,378 | * 5/1999 | Obrejanu | 95/248 |
| 6,036,749 | * 3/2000 | Ribiero et al. | 95/261 |
| 6,066,193 | * 5/2000 | Lee | 95/261 |
| 6,113,675 | * 9/2000 | Branstetter | 95/261 |
| 6,155,345 | * 12/2000 | Lee et al. | 96/214 |

* cited by examiner

Primary Examiner—Duane S. Smith
(74) Attorney, Agent, or Firm—Frank J. Catalano

(57) ABSTRACT

A gas separator connectable between the seating nipple/pump and the mud anchor of a well production line takes advantage of gravitational, shear and centrifugal forces to detrain gas from the formation fluid. An outer cylindrical tube is concentrically secured by upper and lower couplings in relation to an inner cylindrical tube having an axial flow passage and a plurality of radial perforations. The upper coupling is adapted for connection to the seating nipple/pump and the lower coupling is adapted for connection to the mud anchor. The couplings each have a passage therethrough to extend the inner tube axial flow passage in fluid communication between the pump and the mud anchor. The outer cylindrical tube has a plurality of inwardly downwardly centrifugally oriented passages for admitting liquid entrained with gas into an annulus between the tubes and for causing the admitted liquid to flow in a downward spiral in the annulus. The centrifugally oriented passages have irregular sawtooth surfaces extending inwardly downwardly and approximately tangentially in relation to the inner wall of the outer cylindrical tube so as to shear the gas from the fluid and centrifugally cause the gas to move inwardly and the oil and gas combinations to move outwardly in the annulus.

15 Claims, 4 Drawing Sheets

US 6,322,616 B1

GAS SEPARATOR FOR AN OIL WELL PRODUCTION LINE

BACKGROUND OF THE INVENTION:

This invention relates generally to oil production equipment and more particularly concerns separators for removing gas from oil and for preventing gas lock in an oil well production line.

Present gas separators employ inlet pipes with drilled or cut radial holes or slots for the admission of gas entrained fluid into the separator. Typical gas separators have an efficiency ranging from 15 to 40%. Their efficiency is generally inversely related to the quantity of fluid they process. The industry also uses "knockers" which jar the pump in order to prevent gas lock. These devices are generally made of exotic metal and are, therefore, comparatively expensive. Furthermore, despite the greater materials expense, their moving parts demonstrate a high rate of fatigue and failure. Other devices employ springs or other tension mechanisms to assist in the operation of the gas ports. However, these mechanisms are subject to corrosion and collapse. Back pressure valves have also been used to maintain the gas in a constant state of motion, but this solution increases the number of moving and changeable parts and therefore increases ordinary maintenance as well as failure down time.

All of the known separators rely to a great extent on gravity as the sole separating force. While some of the entrained gas may be separated from the fluid at the edges of the inlets to the separator, this contribution to separation is minimal.

It is, therefore, an object of this invention to provide a gas separator for an oil well production line which requires no moving parts. Another object of this invention is to provide a gas separator for an oil well production line which has a relatively high efficiency. A further object of this invention is to provide a gas separator for an oil well production line which does not require jarring of the pump in normal operation. Yet another object of this invention is to provide a gas separator for an oil well production line which takes advantage of gravitational forces in the separation process. It is also an object of this invention to provide a gas separator for an oil well production line which increases the effectiveness of shear forces in the separation process. Still another object of this invention is to provide a gas separator for an oil well production line which uses centrifugal force as an aid to the separation process. An additional object of this invention is to provide a gas separator for an oil well production line which subjects the gas entrained fluid to centrifugal force without the use of moving parts.

SUMMARY OF THE INVENTION:

In accordance with the invention, a gas separator connectable between the seating nipple/pump and the mud anchor of a well production line takes advantage of gravitational, shear and centrifugal forces to detrain gas from the formation fluid. An outer cylindrical tube is concentrically secured by upper and lower couplings in relation to an inner cylindrical tube having an axial flow passage and a plurality of radial perforations. The couplings also close the upper and lower ends of the annulus formed between the outer and inner cylindrical tubes. The upper coupling is adapted for connection to the seating nipple/pump and the lower coupling is adapted for connection to the mud anchor. The couplings each have a passage therethrough to extend the inner tube axial flow passage in fluid communication between the pump and the mud anchor. The outer cylindrical tube has a plurality of inwardly downwardly centrifugally oriented passages for admitting liquid entrained with gas into the annulus and for causing the admitted liquid to flow in a downward spiral in the annulus. Fiberglass wear rings may be inserted between the couplings and the ends of the outer cylindrical tube.

Preferably, the centrifugally oriented passages have irregular sawtooth surfaces extending downwardly at approximately a 10 degree angle from horizontal and approximately tangentially in relation to the inner wall of the outer cylindrical tube. Passages of cross-sectional area equivalent to an approximately 0.04" diameter hole disposed in a staggered approximately ⅜" by ⅜" array on the outer wall of the outer cylindrical tube provide a satisfactory fluid flow rate into the separator. An outer cylindrical tube approximately 6' long with an inner diameter of approximately 3.13" and an outer diameter of approximately 3.88" in conjunction with the other criteria hereinbefore stated has performed satisfactorily. All of the above criteria are satisfactorily met by the use of an open weaver fiberglass pipe.

BRIEF DESCRIPTION OF THE DRAWINGS:

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 5:
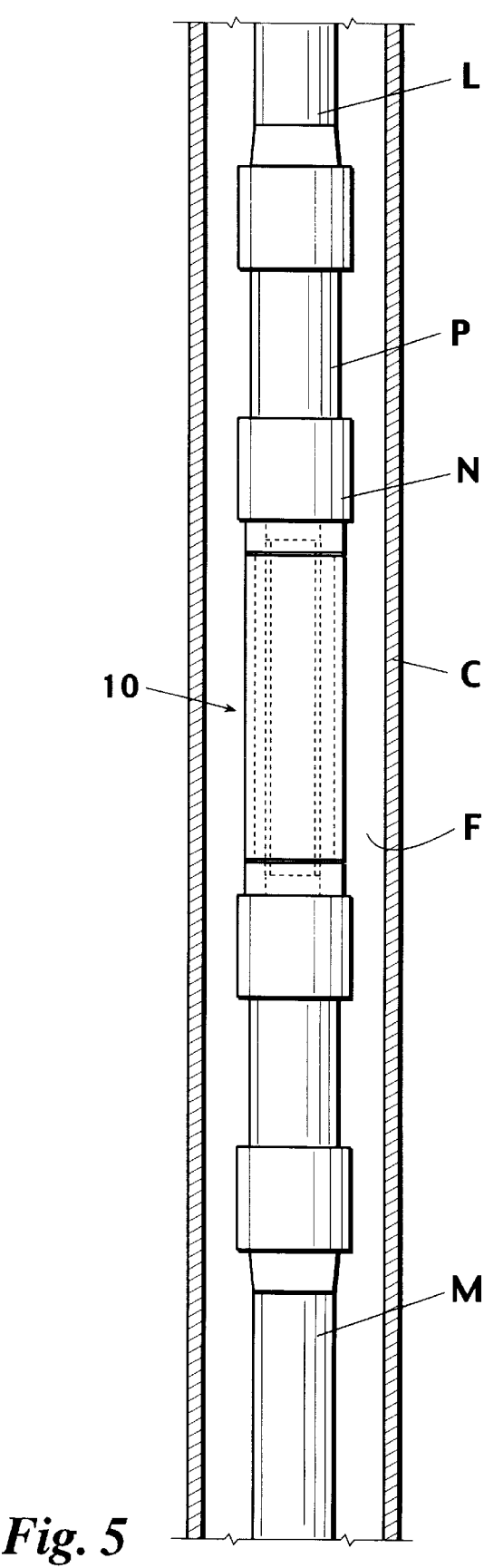
FIG. 5 is a diametric cross sectional view of the gas separator of FIG. 1 connected in a production line.

Looking initially at FIG. 5, a gas separator 10 connectable between the seating nipple N/pump P and the mud anchor M of a well production line L takes advantage of gravitational, shear and centrifugal forces to detrain gas from the formation fluid F.

Considering FIGS. 1–5, an outer cylindrical tube 11 is concentrically secured by upper 13 and lower 15 couplings in relation to an inner cylindrical tube 17 having an axial flow passage 19 and a plurality of radial perforations 21. The couplings 13 and 15 also close the upper 23 and lower 25 ends of the separator annulus 27 formed between the outer 11 and inner 17 cylindrical tubes. The upper coupling 13 is adapted for connection to the seating nipple N/pump P and the lower coupling 15 is adapted for connection to the mud anchor M. The couplings 13 and 15 each have passages 29 and 31 therethrough, respectively, to extend the inner tube axial flow passage 19 in fluid communication between the pump P and the mud anchor M. The outer cylindrical tube M has a plurality of inwardly, downwardly centrifugally oriented passages 33 for admitting liquid entrained with gas into the annulus 27 and for causing the admitted liquid to flow in a downward spiral in the annulus 27. Fiberglass wear rings 35 and 37 may be inserted between the couplings 13 and 15 and the ends of the outer cylindrical tube 11.

Figure 1:
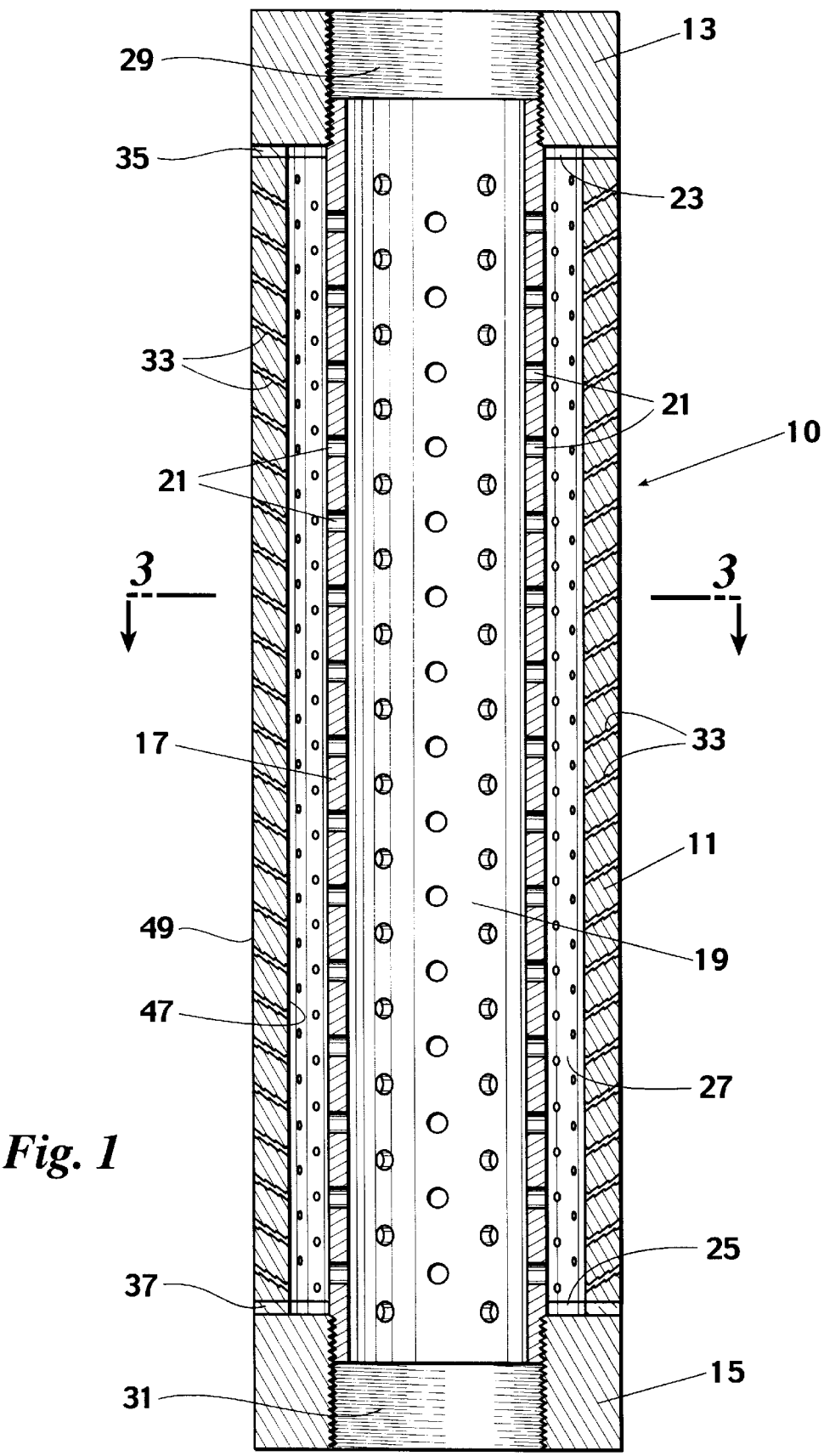
FIG. 1 is a diametric cross-sectional view of a preferred embodiment of the gas separator.
Figure 2:
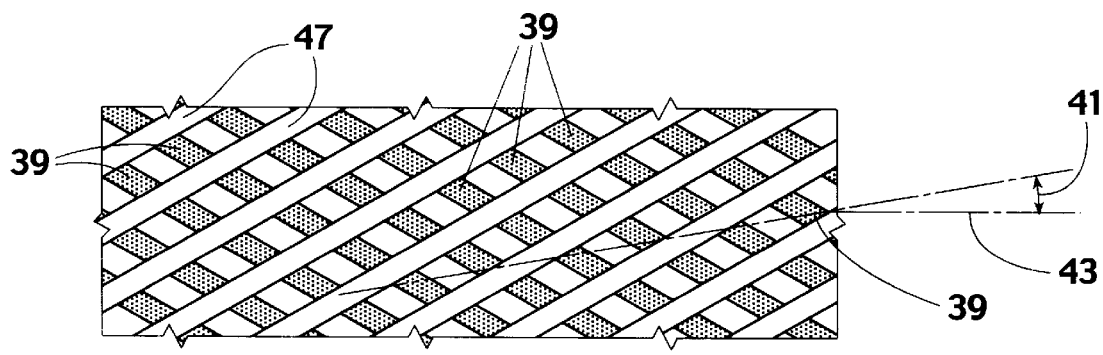
FIG. 2 is a cross-sectional view taken along the line 2—2 of FIG. 1.
Figure 3:
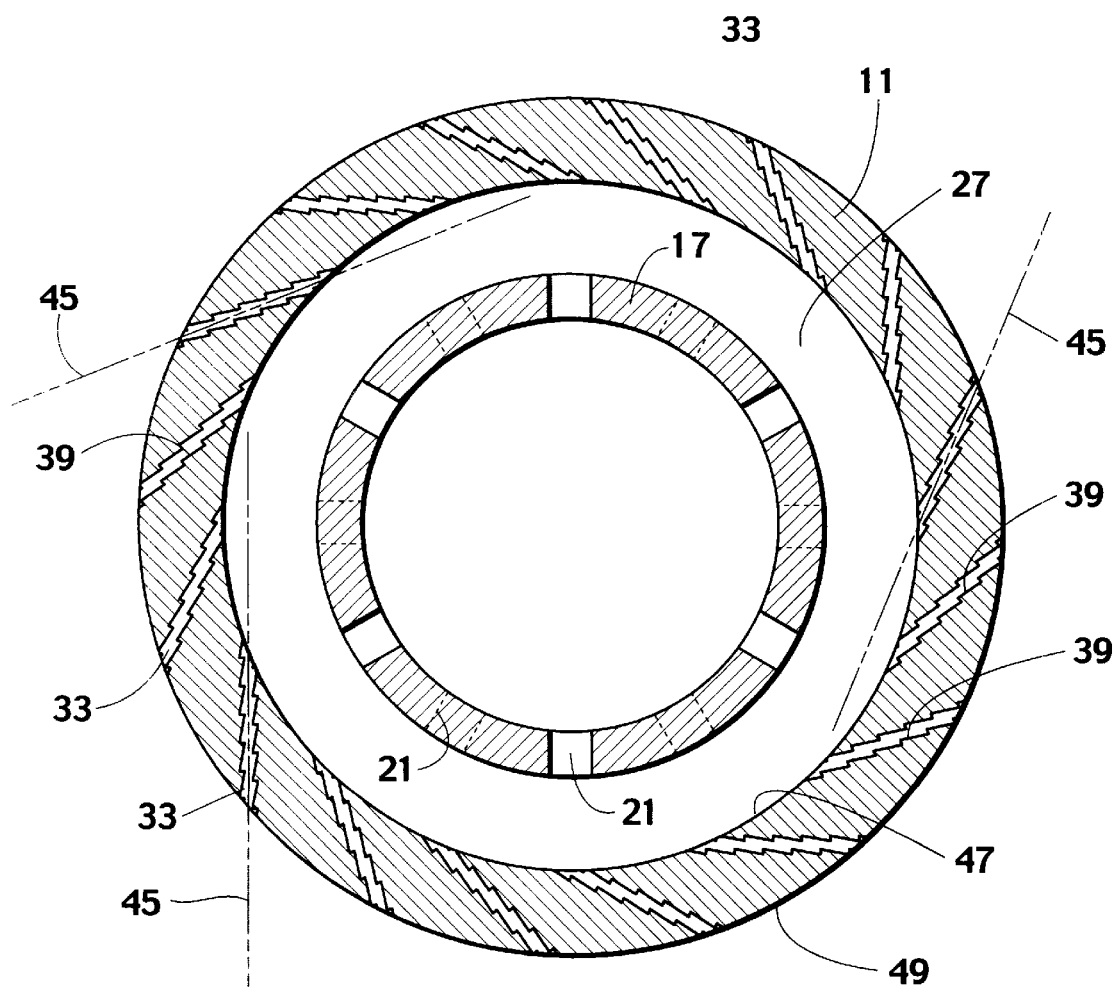
FIG. 3 is a partial front elevation view of the outer cylinder of the gas separator.

Considering the outer cylindrical tube 11 in greater detail, as is best seen in FIGS. 2 and 3, the centrifugally oriented passages 33 have irregular sawtooth surfaces 39 extending downwardly at approximately a 10 degree angle 41 from horizontal 43 and approximately tangentially 45 in relation to the inner wall 47 of the outer cylindrical tube 11. Passages 33 of cross-sectional area equivalent to an approximately 0.04" diameter hole disposed in a staggered approximately ⅜" by ⅜" array on the outer wall 49 of the outer cylindrical tube 11 provide a satisfactory fluid flow rate into the separator 10. An outer cylindrical tube 11 approximately 6' long with an inner diameter of approximately 3.13" and an outer diameter of approximately 3.88" in conjunction with the other criteria hereinbefore stated has performed satisfactorily. All of the above criteria are satisfactorily met by the use of an open weaver fiberglass pipe as illustrated in FIGS. 2 and 3, such pipe being presently available from Smith Fiberglass of Wichita, Kans.

Figure 4:
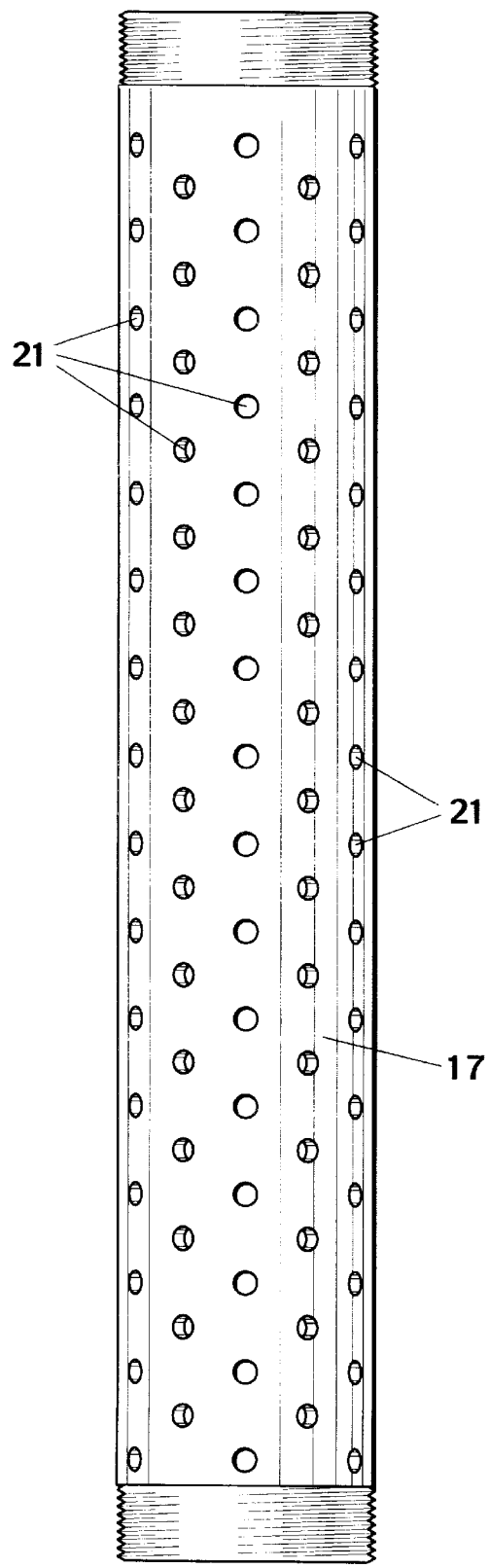
FIG. 4 is a front elevation view of the inner cylinder of the gas separator.

The configuration of the inner cylindrical tube 17 is best seen in FIGS. 3 and 4. Given an outer cylindrical tube 11 of the characteristics hereinbefore stated, the preferred inner cylindrical tube 17 has twelve columns of 5/16" diameter holes 21 with thirty-two holes 21 in each column. Preferably, the columns of holes 21 are alternatively offset as is best seen in FIG. 4. A steel pipe having 2⅞" outer diameter and 2½" inner diameter with 5/16" diameter holes 21 drilled or cut radially into the pipe afford satisfactory performance. As shown, the couplings 13 and 15 are also preferably made from stainless steel stock and consist of a cylindrical body having an outer diameter substantially equal to the outer diameter of the outer cylindrical tube 11 and an inner diameter substantially equal to the outer diameter of the inner cylindrical tube 17, the inner diameters of the couplings 13 and 15 being threaded throughout for engagement with the inner cylindrical tube 17 and either the seating nipple N/pump P or the mud anchor M.

Figure 6:
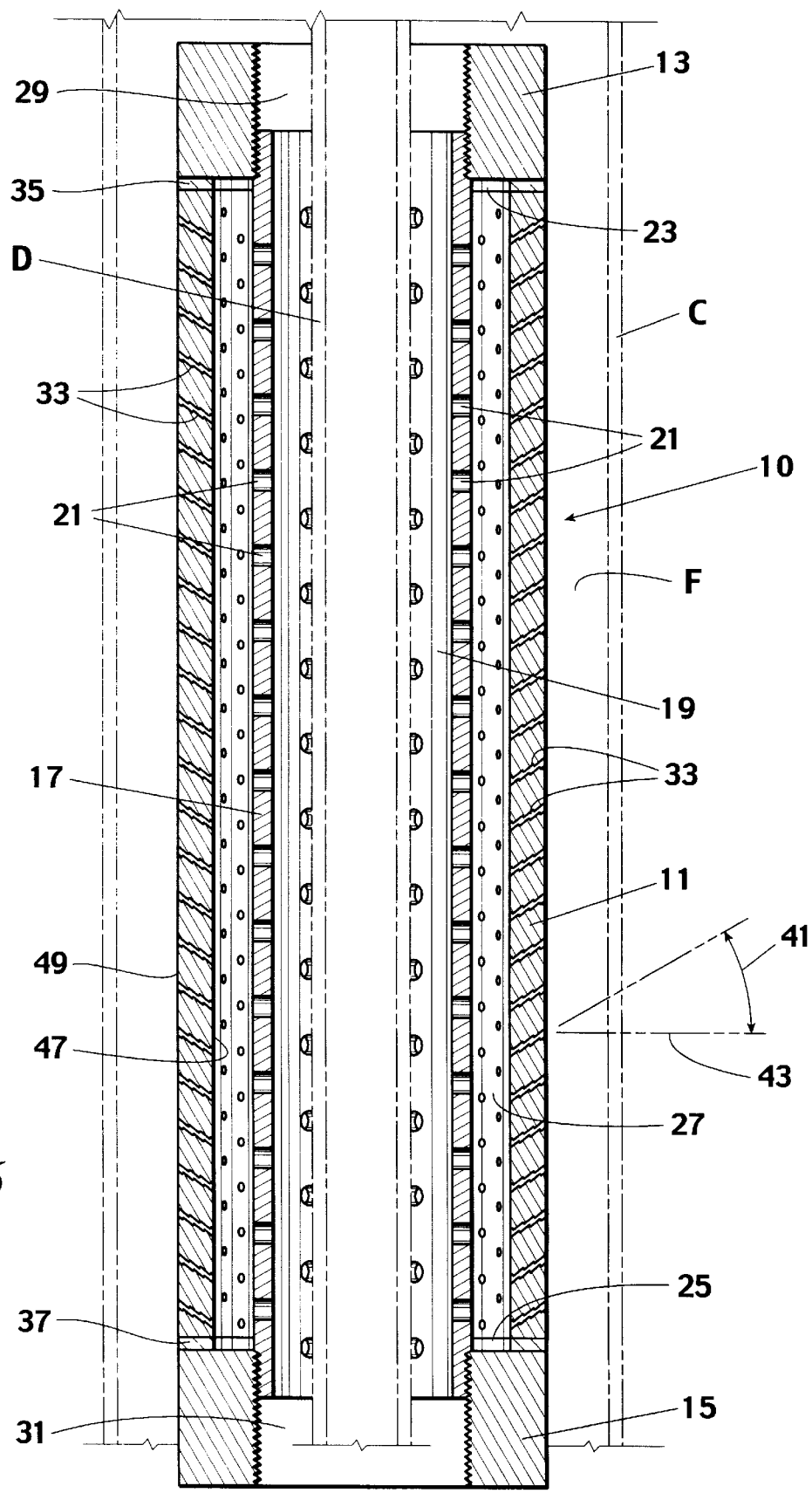
FIG. 6 is a diametric cross-sectional view of the gas separator of FIG. 1 illustrating the operation of the separator and the associated fluid flow pattern.

Turning to FIG. 6, the operation of the gas separator 10 can be understood. The separator 10 is installed within the well casing C between the pump P and the mud anchor M by use of the couplings 13 and 15, respectively, as hereinbefore described. A dip tube D is extended concentrically within the inner cylindrical tube 17 and extends upwardly to the pump P and downwardly into the mud anchor M. Fluid F in the well annulus passes downwardly and tangentially as hereinbefore described through the lower of the passages 33 in the outer cylindrical tube 11. Because of the downward and tangential arrangement of the passages 33, the fluid passing through the passages 33 into the separator annulus 27 downwardly spirals in the annulus 27 until it passes through the radial perforations 21 of the inner cylindrical tube 17 into an annulus between the walls of the inner cylindrical tube 17 and the dip tube D. The fluid which passes through the radial perforations 21 gravitates downwardly into the mud anchor M below the dip tube D and then is able to pass upwardly through the dip tube D to the pump P. As the fluid F passes through the lower passages 33 in the outer cylindrical tube, the irregular sawtooth configuration 39 assists in stripping gas from the fluid so that the gas is able to rise in the annulus 27 between the outer cylindrical tube 11 and the inner cylindrical tube 17 and eventually exit the annulus 27 through the upper passages 33 in the outer cylindrical tube 11. In the spiraling rotation of fluid in the separator annulus 27, oil and gas combinations are centrifugally driven to the outside of the annulus 27 while the lighter gas tends to stay proximate the inside perimeter of the separator annulus 27. Thus, the gas separator 10 takes advantage of the irregular sawtooth passages 33 to enhance gas separation by scrubbing and takes advantage of centrifugal forces to enhance gas separation after scrubbing, thus maximizing the impact of gravitational separation of gas from the fluid.

The specific dimensions stated for the various components of the gas separator 10 are representative of a device that has worked efficiently. However, depending on a particular application, a wide variation in the lengths, diameters, thicknesses, aperture and perforation dimensions, downward passage angles and centrifugal or tangential angles may vary considerably. For example, the specific dimensions of the gas separator hereinbefore given were used in association with a 2⅞" mud anchor, thirty feet in length with a dip tube twenty-one feet in length and the mud anchor plugged at the bottom. In addition, the tubing anchor was used above the pump and, if the tubing anchor were not used, tubing centralizers above and below the separator would be recommended. This configuration afforded a maximum fluid capacity of two hundred fifty barrels a day and a maximum gas capacity of 500,000 cubic feet per day.

Thus, it is apparent that there has been provided, in accordance with the invention, a gas separator that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For connection between a seating nipple/pump and a mud anchor in a well, a gas separator comprising:
    an outer cylindrical tube;
    an inner cylindrical tube having an axial flow passage and a plurality of radial perforations; and
    upper and lower means securing said inner perforated tube concentrically within said outer cylindrical tube with an annulus therebetween and closing upper and lower ends of said annulus, said upper means being adapted for connection to the seating nipple/pump and said lower means being adapted for connection to the mud anchor, said upper and lower means each having a passage therethrough for extending said inner tube axial flow passage into communication with the pump and the mud anchor;
    said outer cylindrical tube having a plurality of inwardly downwardly centrifugally oriented passages therethrough for admitting liquid entrained with gas into said annulus and for causing the admitted liquid to flow in a downward spiral therein.

2. A separator according to claim 1, said centrifugally oriented passages having irregular sawtooth surfaces.

3. A separator according to claim 1, said outer cylindrical tube being an open-weave fiberglass pipe.

4. A separator according to claim 1, said centrifugally oriented passages extending downwardly at approximately a 10 degree angle from horizontal.

5. A separator according to claim 1, said centrifugally oriented passages being approximately tangential in relation to an inner wall of said outer cylindrical tube.

6. A separator according to claim 1, said centrifugally oriented passages having cross-sectional areas equal to a cross-sectional area of a hole of approximately 0.04" diameter and disposed in a staggered approximately 3/8" by 3/8" array on an outer wall of said outer cylindrical tube.

7. For connection between a seating nipple/pump and a mud anchor in a well, a gas separator comprising:

an outer cylindrical tube;

an upper coupling abutting an upper end of said outer cylindrical tube and having a passage therethrough adapted at an upper end thereof for threaded engagement on the seating nipple/pump;

a lower coupling abutting a lower end of said outer cylindrical tube and having a passage therethrough adapted at a lower end thereof for threaded engagement on the mud anchor; and an inner cylindrical tube having a plurality of radial perforations and upper and lower ends adapted for threaded engagement in said upper and lower coupling passages at lower and upper ends thereof, respectively, with said inner perforated tube concentrically aligned within said outer cylindrical tube with an annulus therebetween;

said outer cylindrical tube having a plurality of inwardly downwardly centrifugally oriented passages therethrough.

8. A separator according to claim 7, further comprising a first wear ring disposed between said upper coupling and said upper end of said outer cylindrical tube and a second wear ring disposed between said lower coupling and said lower end of said outer cylindrical tube.

9. A separator according to claim 8, said wear rings being made of fiberglass.

10. A separator according to claim 7, said outer cylindrical tube being an open-weave fiberglass pipe.

11. A separator according to claim 10, said centrifugally oriented passages extending downwardly at approximately a 10 degree angle from horizontal.

12. A separator according to claim 11, said centrifugally oriented passages being approximately tangential in relation to an inner wall of said outer cylindrical tube.

13. A separator according to claim 12, said centrifugally oriented passages having cross-sectional areas approximately equal to a cross-sectional area of a hole of 0.04" diameter and disposed in a staggered approximately 3/8" by 3/8" array on an outer wall of said outer cylindrical tube.

14. A separator according to claim 13, said outer cylindrical tube being approximately 6' long and having an inner diameter of approximately 3.13" and an outer diameter of approximately 3.88".

15. For use in separating gas from fluid in a well production line, a combination connect able below a seating nipple/pump comprising:

a mud anchor;

a gas separator comprising:

an outer cylindrical tube;

an upper coupling abutting an upper end of said outer cylindrical tube and having a passage therethrough adapted at an upper end thereof for threaded engagement on the seating nipple/pump;

a lower coupling abutting a lower end of said outer cylindrical tube and having a passage therethrough adapted at a lower end thereof for threaded engagement on said mud anchor; and an inner cylindrical tube having a plurality of radial perforations and upper and lower ends adapted for threaded engagement in said upper and lower coupling passages at lower and upper ends thereof, respectively, with said inner perforated tube concentrically aligned within said outer cylindrical tube with an annulus therebetween;

said first cylindrical tube having a plurality of inwardly downwardly centrifugally oriented passages therethrough; and a dip tube extending from an intake port of the pump concentrically through said separator inner tube with an annulus therebetween into said mud anchor.

* * * * *